United States Patent
Jaksa (10) Patent No.: US 11,757,365 B2
(45) Date of Patent: Sep. 12, 2023

(54) DYNAMIC TRANSIENT CONTROL IN RESONANT CONVERTERS

(71) Applicant: Murata Manufacturing Co., Ltd., Nagaokakyo (JP)

(72) Inventor: Rubinic Jaksa, Markham (CA)

(73) Assignee: MURATA MANUFACTURING CO., LTD., Kyoto (JP)

(*) Notice: Subject to any disclaimer, the term of this patent is extended or adjusted under 35 U.S.C. 154(b) by 370 days.

(21) Appl. No.: 17/275,000

(22) PCT Filed: Sep. 6, 2019

(86) PCT No.: PCT/US2019/049844
§ 371 (c)(1),
(2) Date: Mar. 10, 2021

(87) PCT Pub. No.: WO2020/055669
PCT Pub. Date: Mar. 19, 2020

(65) Prior Publication Data
US 2022/0060120 A1 Feb. 24, 2022

Related U.S. Application Data

(60) Provisional application No. 62/730,152, filed on Sep. 12, 2018.

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0058* (2021.05); *H02M 1/08* (2013.01)

(58) Field of Classification Search
CPC .. H02M 3/33592; H02M 1/0058; H02M 1/08; H02M 3/01; H02M 3/33573
See application file for complete search history.

(56) References Cited

U.S. PATENT DOCUMENTS 9,929,638 B2 * 3/2018 Afsharian ......... H02M 3/33576
10,554,136 B1 * 2/2020 Miletic ............ H02M 3/33515
(Continued)

FOREIGN PATENT DOCUMENTS

JP 2003-174773 A 6/2003
JP 2016-189654 A 11/2016
(Continued)

OTHER PUBLICATIONS

Official Communication issued in International Patent Application No. PCT/US2019/049844, dated Jan. 31, 2020.

*Primary Examiner* — Kyle J Moody
(74) *Attorney, Agent, or Firm* — KEATING & BENNETT, LLP (57) ABSTRACT

A converter includes a switching stage including first and second primary transistors, a resonant stage connected to the switching stage, a transformer including a primary winding connected to the resonant stage, a rectifying stage connected to a secondary winding of the transformer and including first and second synchronous rectifiers, and a controller. The controller is configured and/or programmed to operate in a steady-state mode in which an output voltage of the converter is regulated by varying a switching frequency of the first and second primary transistors and of the first and second synchronous rectifiers and a synchronous-rectification control mode in which the output voltage is regulated when an output-voltage overshoot is detected by switching the first and second primary transistors and the first and second synchronous rectifiers at a fixed switching frequency and by varying a duty cycle of the first and second synchronous rectifiers.

11 Claims, 8 Drawing Sheets

(56) References Cited

U.S. PATENT DOCUMENTS

| | | | |
|---|---|---|---|
| 10,637,363 B2* | 4/2020 | Wang | H02M 3/33592 |
| 11,063,520 B2* | 7/2021 | Chen | H02M 3/33571 |
| 2006/0033483 A1 | 2/2006 | Wu | |
| 2006/0187686 A1* | 8/2006 | Sun | H02M 3/33592 363/17 |
| 2010/0097826 A1* | 4/2010 | Xu | H02M 3/33592 363/17 |
| 2015/0229219 A1* | 8/2015 | Choi | H02M 3/33592 363/21.02 |
| 2022/0158536 A1* | 5/2022 | Jaksa | H02M 1/0058 |

FOREIGN PATENT DOCUMENTS

| | | |
|---|---|---|
| JP | 2018-129953 A | 8/2018 |
| KR | 10-1659729 B1 | 9/2016 |

* cited by examiner

Fig. 4
Regular variable frequency control loop

Fig. 5
Transient control loop

Transient control mechanics
Fig. 6

Fig. 8 Zoom-in of the transition to SR control

Fig. 9

Zoom-in of the transition back to frequency control

DYNAMIC TRANSIENT CONTROL IN RESONANT CONVERTERS

BACKGROUND OF THE INVENTION

1. Field of the Invention

The present invention relates to DC/DC converters. More specifically, the present invention relates to dynamic transient control in resonant converters.

2. Description of the Related Art

Figure 1:
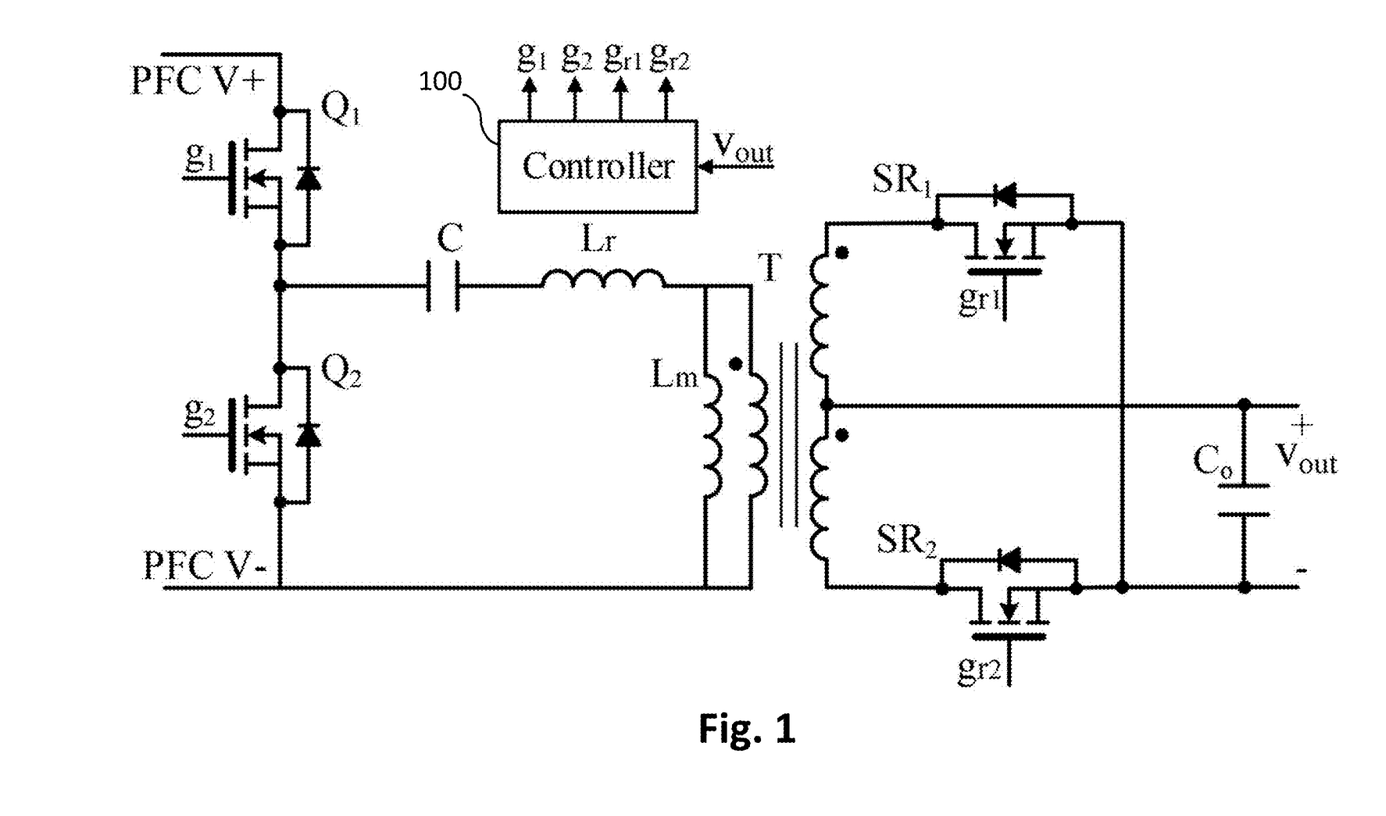
FIG. 1 shows a circuit diagram of a half-bridge LLC converter with a single resonant capacitor.
Figure 2:
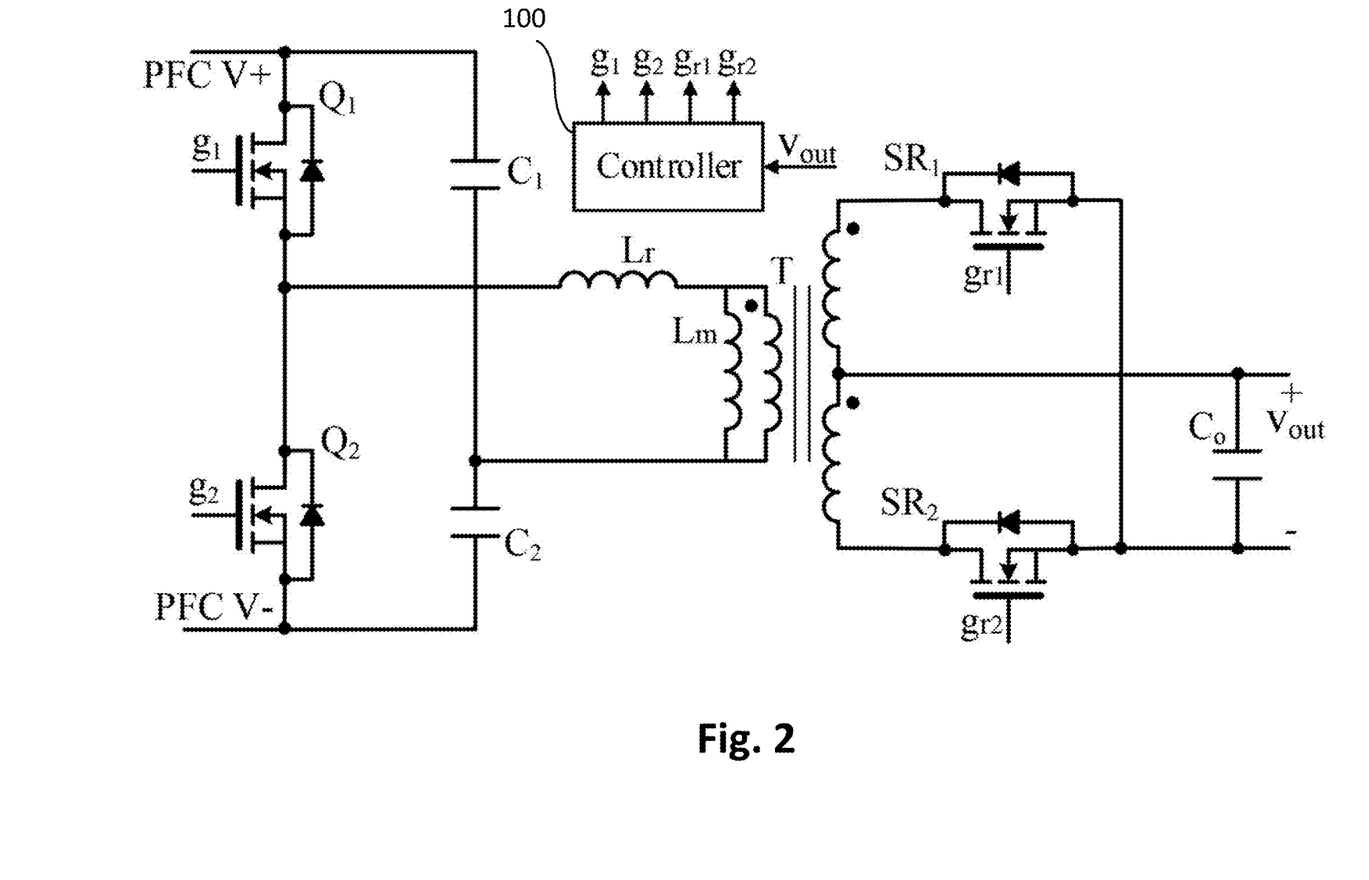
FIG. 2 shows a circuit diagram of a half-bridge LLC converter with split resonant capacitors.
Figure 3:
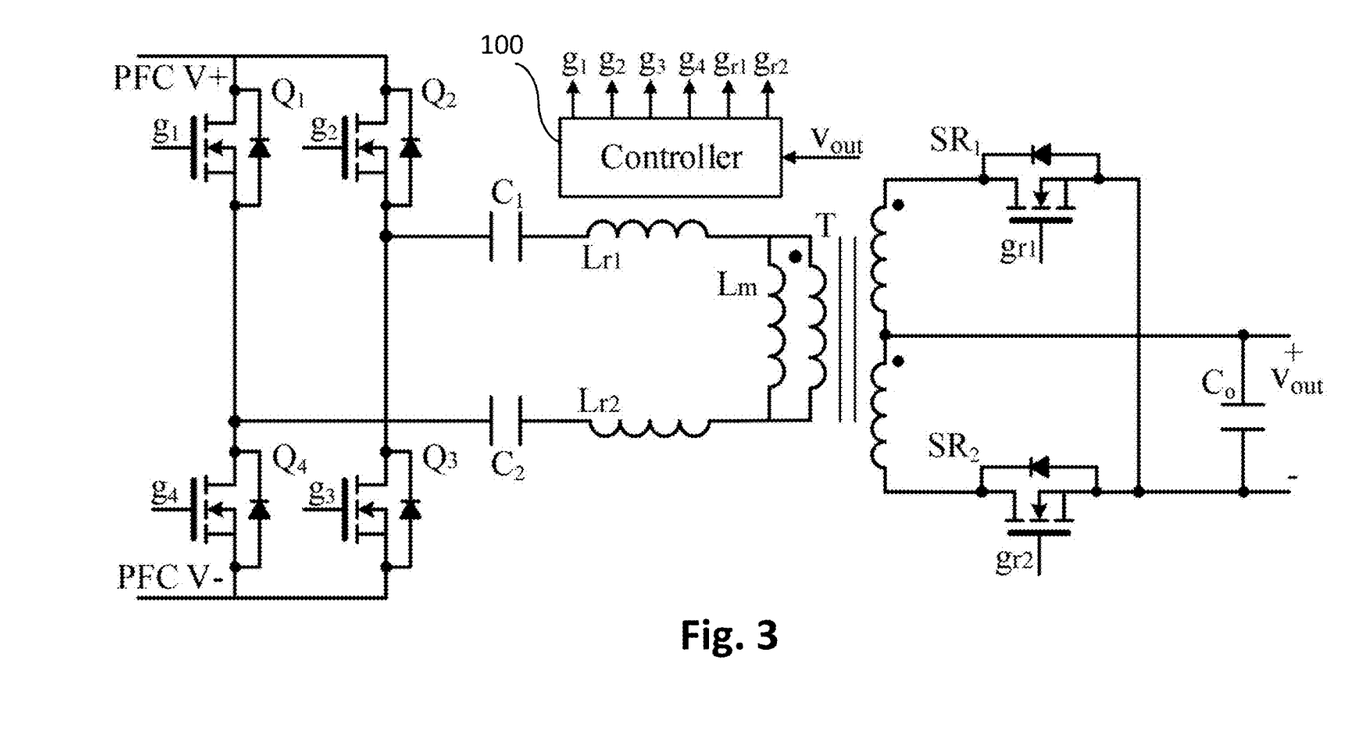
FIG. 3 shows a circuit diagram of a full-bridge LLC converter.

FIGS. 1-3 show LLC converters. The circuits shown in FIGS. 1-3 can be used with known converters and with converters according to preferred embodiments of the present invention. The dynamic performances of known LLC converters, such as those shown in FIGS. 1-3, may not be satisfactory because of the limitations of the power train. For example, a full-bridge LLC converter can be limited in its switching frequency range, with a maximum switching frequency of 200 kHz, to maintain full zero voltage switching (ZVS) operation under all conditions. However, the converter's transient response capability is diminished during heavy-to-light-load transients, where a significant output-voltage overshoot can be noticeable. That is, when the converter goes from heavy load to light load, the output voltage can overshoot the intended nominal output voltage.

The LLC converters shown in FIGS. 1-3 can be connected to a power factor correction (PFC) stage that provides the input voltage to the LLC converters on the terminals PFC V+, PFC V−. Because, at heavy load, the PFC stage regulates the voltage on the terminals PFC V+, PFC V− at a higher DC value to address, in part, the AC ripple superimposed on the average input voltage, the total maximum transient voltage when transitioning from a heavy load to a light load can surpass, for example, 410 V. If the load on the converter is reduced at the moment when the input voltage provided by the PFC stage is at its peak, the converter with its limited regulation capabilities might not be able to fully suppress the voltage transient.

If the converter uses a known proportional-integral (PI) controller, the converter's transient response can be poor, leading to an output-voltage overshoot of up to 1 V during heavy-to-light-load transient response. Because this response can be poor, known converters can require droop sharing instead of active sharing to meet the requirements for a 100%-to-60% load transient and for a 60%-to-10% load transient.

The problem is specific to frequency-controlled topologies that experience difficulties meeting transient-response requirements due to the limitations in the maximum switching frequency at which the converter can safely operate.

SUMMARY OF THE INVENTION

To overcome the problems described above, preferred embodiments of the present invention provide LLC converters each with dynamic transient control in which the duty cycle of the synchronous rectifiers is controlled after an output-voltage overshoot is detected.

According to a preferred embodiment of the present invention, a converter includes a switching stage including first and second primary transistors, a resonant stage connected to the switching stage, a transformer including a primary winding connected to the resonant stage, a rectifying stage connected to a secondary winding of the transformer and including first and second synchronous rectifiers, and a controller. The controller is configured and/or programmed to operate in a steady-state mode in which an output voltage of the converter is regulated by varying a switching frequency of the first and second primary transistors and of the first and second synchronous rectifiers and a synchronous-rectification control mode in which the output voltage is regulated when an output-voltage overshoot is detected by switching the first and second primary transistors and the first and second synchronous rectifiers at a fixed switching frequency and by varying a duty cycle of the first and second synchronous rectifiers.

The fixed switching frequency preferably is a maximum switching frequency of the converter that ensures a zero voltage switching operation of the first and second primary transistors. Preferably, the controller switches from the synchronous-rectification control mode to the steady-state mode if either the duty cycle of the first and second synchronous rectifiers is at a maximum duty cycle or the output voltage drops below a nominal output voltage of the converter.

The switching stage preferably includes third and fourth primary transistors. The first and second primary transistors of the switching stage preferably are arranged in a half-bridge. The first, second, third, and fourth primary transistors of the switching stage preferably are arranged in a full-bridge.

The resonant stage preferably includes a resonant capacitor and a resonant inductor connected in series. The resonant stage preferably includes a magnetizing inductor connected in parallel with the primary winding.

Preferably, the secondary winding includes first and second secondary windings; the first synchronous rectifier is connected to the first secondary winding; and the second synchronous rectifier is connected to the second secondary winding.

Each of the first and second primary transistors and the first and second synchronous rectifiers is preferably a metal-oxide-semiconductor field-effect transistor. The each of the first and second synchronous rectifiers preferably includes a transistor and a body diode connected in parallel with a channel of the transistor.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

FIG. 1 shows a half-bridge LLC converter with a single resonant capacitor C. This converter includes a primary side and a secondary side. The primary side is the side of the converter located between the terminals PFC V+, PFC V− and the transformer T. The secondary side is the side of the converter located between the transformer T and the output terminals $V_{out}$+, −. A PFC stage (not shown) provides a DC input to the converter at terminals PFC V+, PFC V−.

The primary circuit includes primary switches $Q_1$, $Q_2$, resonant inductor $L_r$, resonant capacitor C, and inductor $L_m$. The primary switches $Q_1$, $Q_2$ define a switching stage and are connected to the terminals PFC V+, PFC V−. The resonant inductor $L_r$, resonant capacitor C, and inductor $L_m$ define a resonant stage. The resonant inductor $L_r$ and the resonant capacitor C are connected in series with each other and are connected between the primary windings of the transformer T and a node between the primary switches $Q_1$, $Q_2$. Inductor $L_m$ is connected in parallel across the primary windings of the transformer T. The secondary circuit includes synchronous rectifiers $SR_1$, $SR_2$, output capacitor $C_o$, and output terminals $V_{out}$+, −. The transformer T includes two secondary windings. The synchronous rectifiers $SR_1$, $SR_2$ define a rectifying stage and are connected to the secondary windings of the transformer T. The output capacitor $C_o$ is connected in parallel to a node between the two secondary windings and the output terminal+. The above described components are typical of LLC converters, including those shown in FIGS. 2 and 3.

FIG. 2 shows a half-bridge LLC converter with split resonant capacitors $C_1$, $C_2$. The converter shown in FIG. 2 is similar to the converter shown in FIG. 1 except that the resonant capacitor C is split into resonant capacitors $C_1$, $C_2$. The resonant capacitors are connected in series with each other and connected in parallel with the terminals PFC V+, PFC V−. The node between the capacitors $C_1$, $C_2$ is connected to the primary winding of the transformer T.

FIG. 3 shows a full-bridge LLC converter. The converter shown in FIG. 3 is similar to the converters shown in FIGS. 1 and 2 but includes a full-bridge instead of a half-bridge. The primary circuit includes primary switches $Q_1$, $Q_2$, $Q_3$, $Q_4$, resonant inductors $L_{r1}$, $L_{r2}$, resonant capacitors $C_1$, $C_2$, and inductor $L_m$. The primary switches $Q_1$, $Q_2$, $Q_3$, $Q_4$ define a switching stage and are connected in a full bridge and are connected to the terminals PFC V+, PFC V−. The resonant inductor $L_{r1}$ and the resonant capacitor $C_1$ are connected in series with each other and are connected between the primary windings of the transformer T and a node between the primary switches $Q_2$, $Q_4$. The resonant inductor $L_{r2}$ and the resonant capacitor $C_2$ are connected in series with each other and are connected between the primary windings of the transformer T and a node between the primary switches $Q_1$, $Q_3$. Inductor $L_m$ is connected in parallel across the primary windings of the transformer T.

The primary switches $Q_1$, $Q_2$, $Q_3$, $Q_4$ and the synchronous rectifiers $SR_1$, $SR_2$ in FIGS. 1-3 can be metal-oxide-semiconductor field-effect transistors (MOSFETs), but other suitable transistors can also be used. The primary switches $Q_1$, $Q_2$, $Q_3$, $Q_4$ and the synchronous rectifiers $SR_1$, $SR_2$ can be switched on and off by a controller. The controller 100 can switch on and off the primary switches $Q_1$, $Q_2$, $Q_3$, $Q_4$ and the synchronous rectifiers $SR_1$, $SR_2$ based on the output voltage $V_{out}$. The controller 100 can be implemented using one or more digital microcontrollers, which can be programmed and/or configured to implement the transient control method discussed below. The controller 100 can be any type of digital processor regardless of the architecture, including, but not limited to, a digital signal processor (DSP), a programmable intelligent computer (PIC), a field-programmable gate array (FPGA), an AVR microcontroller, etc. The transient control method can be executed at any arbitrary speed with a custom sampling rate depending on the converter's switching frequency. The controller's gain and reference can be adjusted in any way to fit the design and to provide a stable control loop. The controller 100 can be connected on either the primary side or the secondary side. Isolation between the primary and secondary sides can be maintained by transmitting signals across the isolation boundary using an isolator, including, for example, a digital isolator or an opto-isolator such as an opto-coupler.

During steady-state operation of the converter, the controller 100 regulates the output voltage $V_{out}$ by changing the switching frequency of the transistors in the switching stage and the rectifying stage. The converter is operated in an inductive region of the resonant stage such that the impedance of the resonant stage increases with the higher frequency. That is, a higher load results in a lower switching frequency, and a lower power results in a higher frequency.

During heavy-load-to-light-load transitions, an output-voltage overshoot can occur. A transient control method implemented in the controller 100 can control the synchronous rectifiers to achieve the desired voltage drop across the body diode of the synchronous rectifiers in the rectifying stage. Current conduction through the body diodes of the synchronous rectifiers, instead of the channel of the synchronous rectifier, produces a voltage drop of approximately 0.8 V, which can be used to compensate the limited maximum switching frequency of the converter.

Switching frequency is inversely proportional to the output voltage. A higher switching frequency provides a lower output voltage, and a lower switching frequency provides a higher output voltage. After a heavy-load-to-light-load transition, the output voltage $V_{out}$ momentarily increases because the sensors and the controller 100 can include a processing delay and because of the time that the control loop takes to increase the switching frequency enough to suppress the transient in the output voltage $V_{out}$ and to tune the switching frequency to match the new current level set by the load.

A higher switching frequency reduces the gain of the resonant tank, and therefore the output voltage $V_{out}$. If the maximum switching frequency of the converter is limited to, for example, 200 kHz, and if the controller is operating in steady-state mode and suddenly the load changes, then the output voltage $V_{out}$ can rise quickly and the controller 100 reaches the maximum frequency limit. If the maximum switching frequency of 200 kHz is not high enough, then the output voltage $V_{out}$ can overshoot to 13 V, for example. But, if the maximum switching frequency was, for example, 300 kHz, then the output voltage $V_{out}$ would overshoot to only 12.5 V, for example.

Synchronous rectifiers $SR_1$, $SR_2$ ideally do not have a voltage drop when fully ON, but realistically have a voltage drop of a few millivolts because the synchronous rectifiers $SR_1$, $SR_2$ have a very low drain-to-source on resistance $RDS_{ON}$ when fully ON. All power MOSFETs include a body diode connected in parallel with the built-in channel, i.e., from the MOSFET's source to the MOSFET's drain. This body diode, like any other diode, is a non-ideal conductor and creates a voltage drop of around 0.6 V to 0.7 V. The body diode can be used to prevent the output voltage $V_{out}$ from reaching 13 V. Specifically, the body diode can be used to compensate for not being able to increase the switching frequency.

The voltage drop is regulated by changing the conduction time, i.e., the duty cycle, of the synchronous rectifiers $SR_1$, $SR_2$. For instance, if the synchronous rectifier $SR_1$ or $SR_2$ is fully ON, then zero current is transmitted through the body diode, i.e., there is ideally no voltage drop. If the synchronous rectifier $SR_1$ or $SR_2$ is fully off, then the full current will go through the diode, with maximum voltage drop of 0.7 V. If the synchronous rectifier is turned ON for only 50% of the resonant cycle, i.e., with a duty cycle d=0.5, and the synchronous rectifier $SR_1$ or $SR_2$ is turned OFF for the other 50%, then the average voltage drop is half of 0.7 V, or 0.35 V. In a similar manner, any other voltage drop can be created by modulating the duty cycle of the synchronous rectifiers $SR_1$ and $SR_2$. Finally, the controller 100 will drive the synchronous rectifiers $SR_1$ and $SR_2$ with the duty cycle that mitigates the output-voltage overshoot.

The above described transient control method can be used in all types of LLC resonant converters, including the LLC resonant converters shown in FIGS. 1-3.

Figure 4:
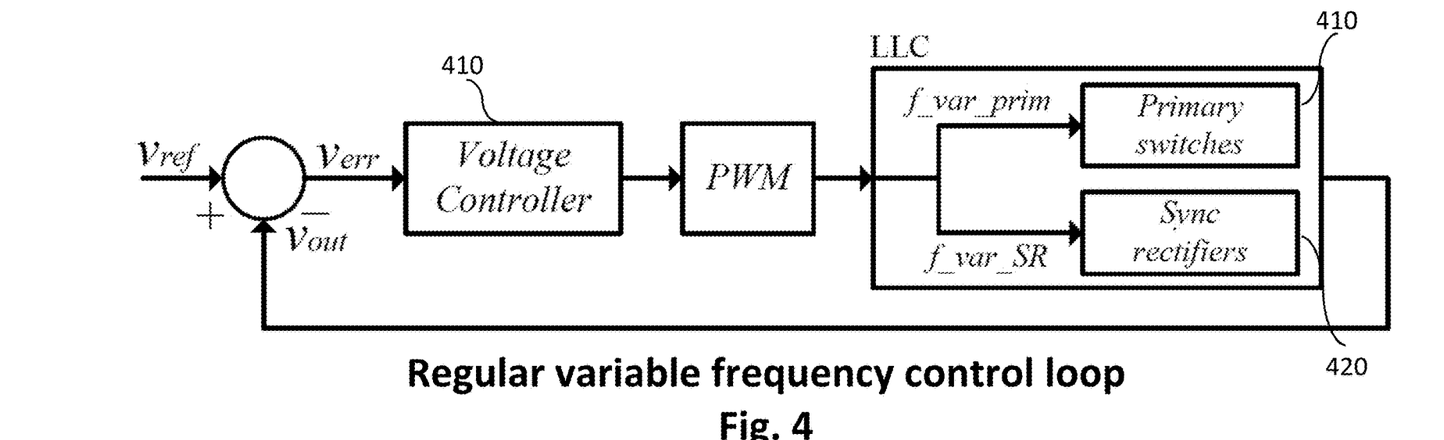
FIG. 4 shows a regular variable frequency control loop.
Figure 5:
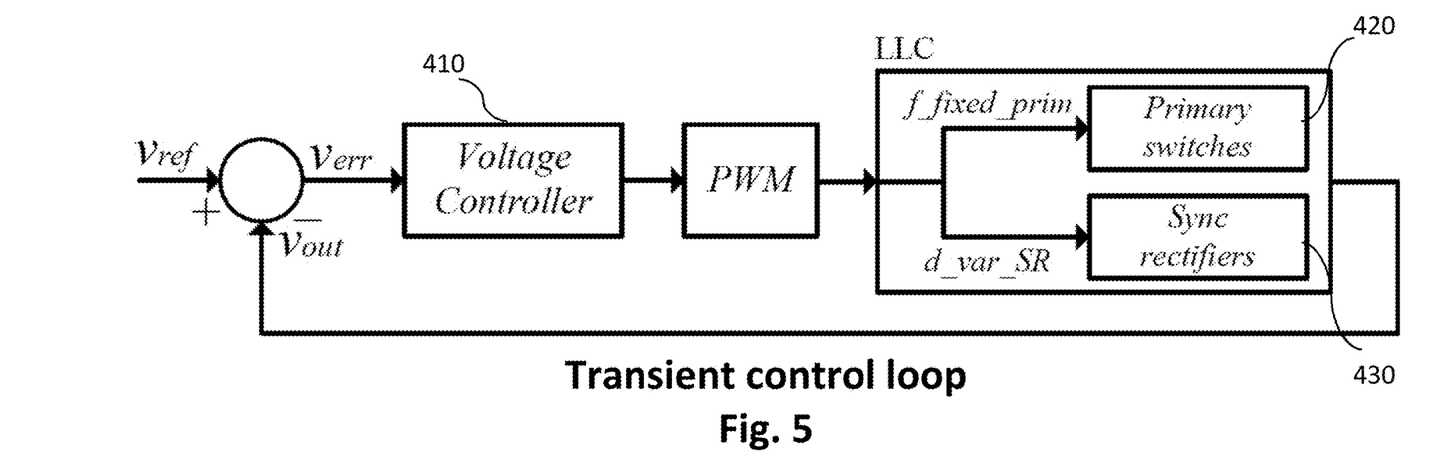
FIG. 5 shows a transient control loop.

FIGS. 4 and 5 show block diagrams of closed-loop control of a converter with two operation modes. In FIG. 4, during steady-state mode, the controller 410 controls the converter by adjusting the switching frequency of the primary switches 420, e.g., the primary switches $Q_1$, $Q_2$, $Q_3$, $Q_4$ in FIGS. 1-3, and the switching frequency of the synchronous rectifiers 430, e.g., the synchronous rectifiers $SR_1$, $SR_2$ in FIGS. 1-3, which modifies the gain of the converter. The controller 410 drives the primary switches 420 and the synchronous rectifiers 430 at the same frequency. That is, the switching frequency f_var_prim and switching frequency f_var_SR in FIG. 4 are the same. During a load transient, as shown in FIG. 5, the controller 410 can temporarily switch into a synchronous rectification control (SR-control) mode and assumes duty-cycle control of the synchronous rectifiers 430, while maintaining fixed frequency operation for all switches (both the primary switches 420 and the synchronous rectifiers 430). That is, the primary switches 420 and the synchronous rectifiers 430 are switched at the same switching frequency, while the duty cycle of the synchronous rectifiers 430 is controlled by signal d_var_SR.

Initialization of the controller includes setting the control parameters to predetermined values the first time that the controller is activated, e.g., when the converter is powered up. Before $t=T_0$ shown in FIG. 7, the converter is running in steady-state mode, and then at time $t=T_0$, the load has transitioned from a large load to a light load, producing a large overshoot in the output voltage Vout of waveform 720. The controller responds by increasing the switching frequency until the saturation point is reached. The controller fixes the switching frequency at the maximum switching frequency, and the controller re-initializes the control parameters to prepare the controller for the SR-control mode. Control parameters such as gain constants and any previous stored controller output and previous error signal are either cleared or given some new initial value. For example, in a PI controller, the proportional gain Kp and the integral gain Ki can be set to new values. All previous stored control parameters that were used during steady-state mode can be initially set to zero, and the integration portion of the PI controller can be re-initialized such that the controller output is set to begin with 50% duty cycle, i.e., with a duty cycle d=0.5. A change in SR-control mode is shown in the SR gate-pulse waveform 730 in FIG. 7. A 50% duty cycle is an example compromise, and other initial duty cycles can be used. If the duty cycle is initially set at 100%, i.e., with a duty cycle d=1 with the synchronous rectifiers SR1, SR2 fully ON, then there is no voltage drop at the beginning of the SR-control mode, and by the time the controller lowers the duty cycle, the output voltage Vout can increase to an even higher value. If duty cycle is initially set at 0%, i.e., with a duty cycle d=0 with the synchronous rectifiers fully OFF, then the output voltage Vout can immediately drop about 0.7 V (because all of the current is going through the body diode), which may be too much because the output voltage Vout can undershoot the nominal voltage to be below, for example, 12 V. Thus, the initial value for the duty cycle can be chosen to be 50%, which will reduce the output voltage Vout by around 0.35 V and which will prevent the output voltage Vout from increasing. The controller can then fine tune and adjust the duty cycle to bring the output voltage Vout close to the nominal voltage.

Figure 7:
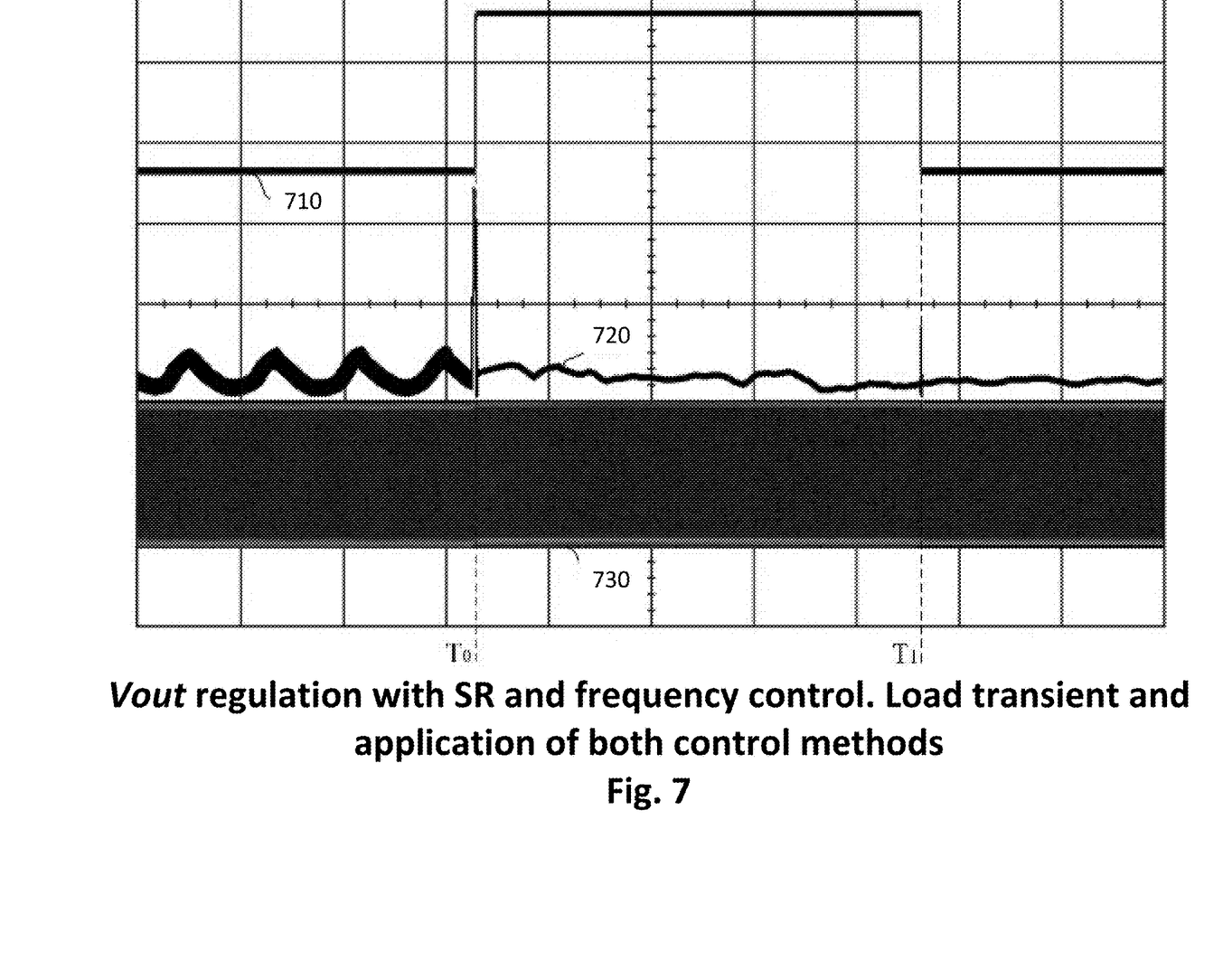
FIGS. 7-9 show converter waveforms during a transition from steady-state mode to the SR-control mode and a transition from the SR-control mode to the steady-state mode.

The converter can be in the SR-control mode, when the output voltage Vout of waveform 720 significantly overshoots the nominal voltage as a consequence of a large load transition and when the output-voltage overshoot cannot be mitigated by regular frequency control. These events can be independent one from another, can depend on load condition, and can be random in nature. When the SR-control mode is finished at time $t=T_1$, as shown in FIG. 7, the controller setup is reversed, and all control parameters are again re-initialized for the steady-state mode.

It should be understood that the specific values discussed above are examples and other values can also be used. The specific values are typically design specific and will be different for different applications and converter topologies.

Figure 6:
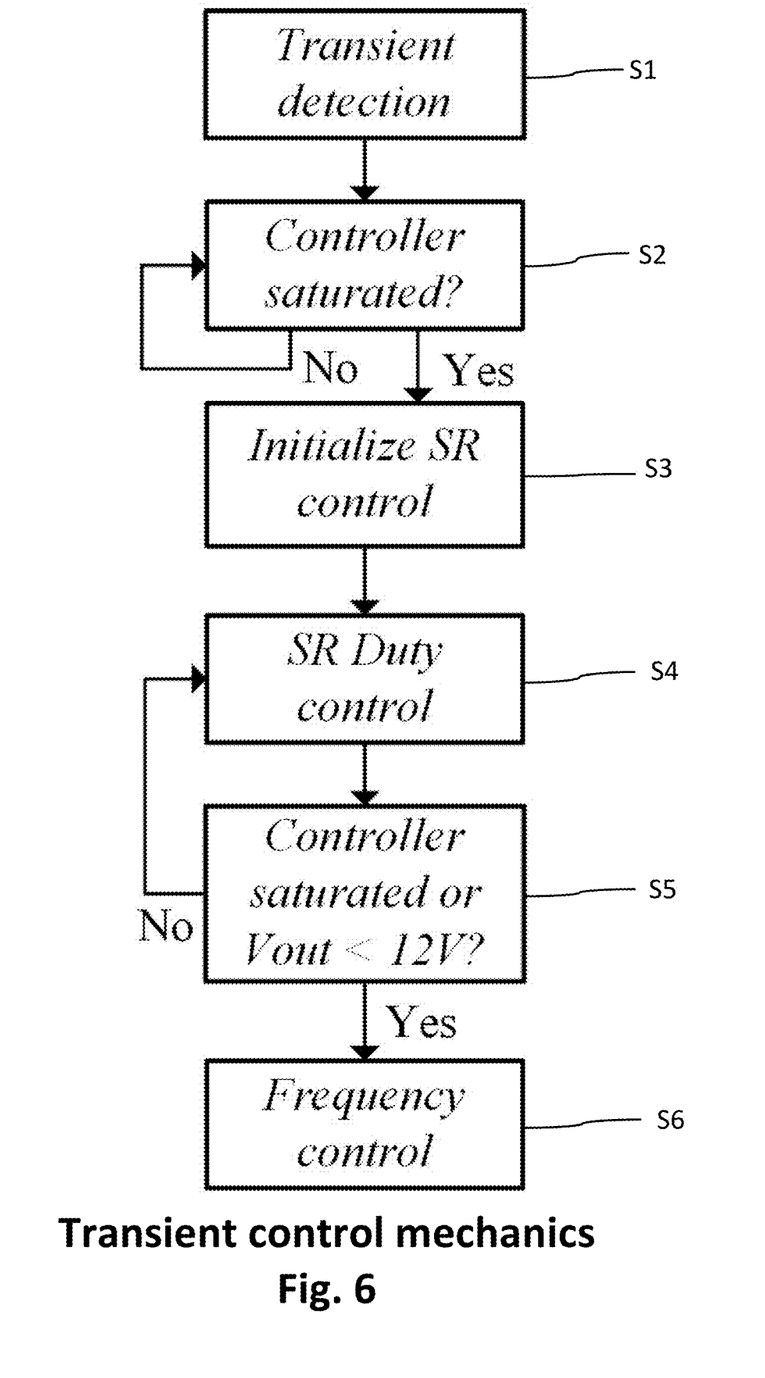
FIG. 6 shows a transient-control flow chart.

FIG. 6 shows a flow diagram of a transient control method. Upon detection of a load transient in step S1, the controller monitors the saturation state of the controller to determine if the controller is able to regulate the output voltage to the nominal value by changing the switching frequency of the primary switches and the synchronous rectifiers in step S2. For example, a converter might have an upper saturation limit of 200 kHz. If the upper limit is reached, i.e., the suppression of the overshoot in the steady-state mode is at the maximum, then in step S3 the controller switches to the SR-control mode. The controller fixes the switching frequency of all of the switches at the upper saturation limit, e.g., 200 kHz, and the controller is re-initialized for duty cycle control of the synchronous rectifiers.

The controller remains in SR-control mode in step S4 until one of two conditions are satisfied at step S5. The first condition is that the controller saturates to the maximum value, meaning that the duty cycle of the synchronous rectifiers is at the maximum duty cycle. The second condition is that the output voltage drops below the nominal value by monitoring when the error signal Verr (i.e., the difference in the reference voltage Vref, which is the nominal value, and output voltage Vout in FIGS. 4 and 5) approaches zero. When one of the two conditions is satisfied, in step S6 the controller can re-initialize the parameters and transition back to the steady-state mode with frequency control of the switches.

Figure 8:
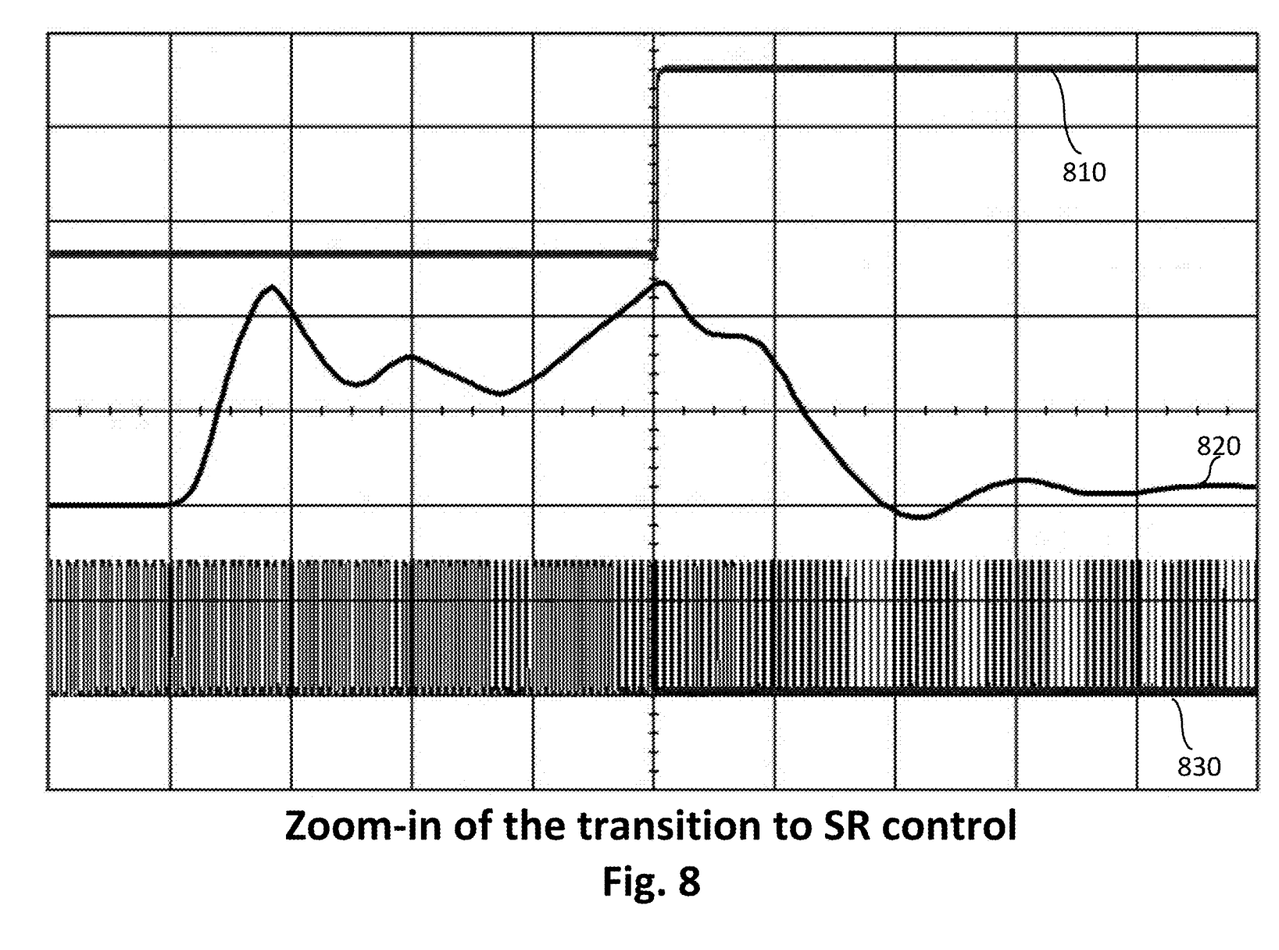
Figure 9:
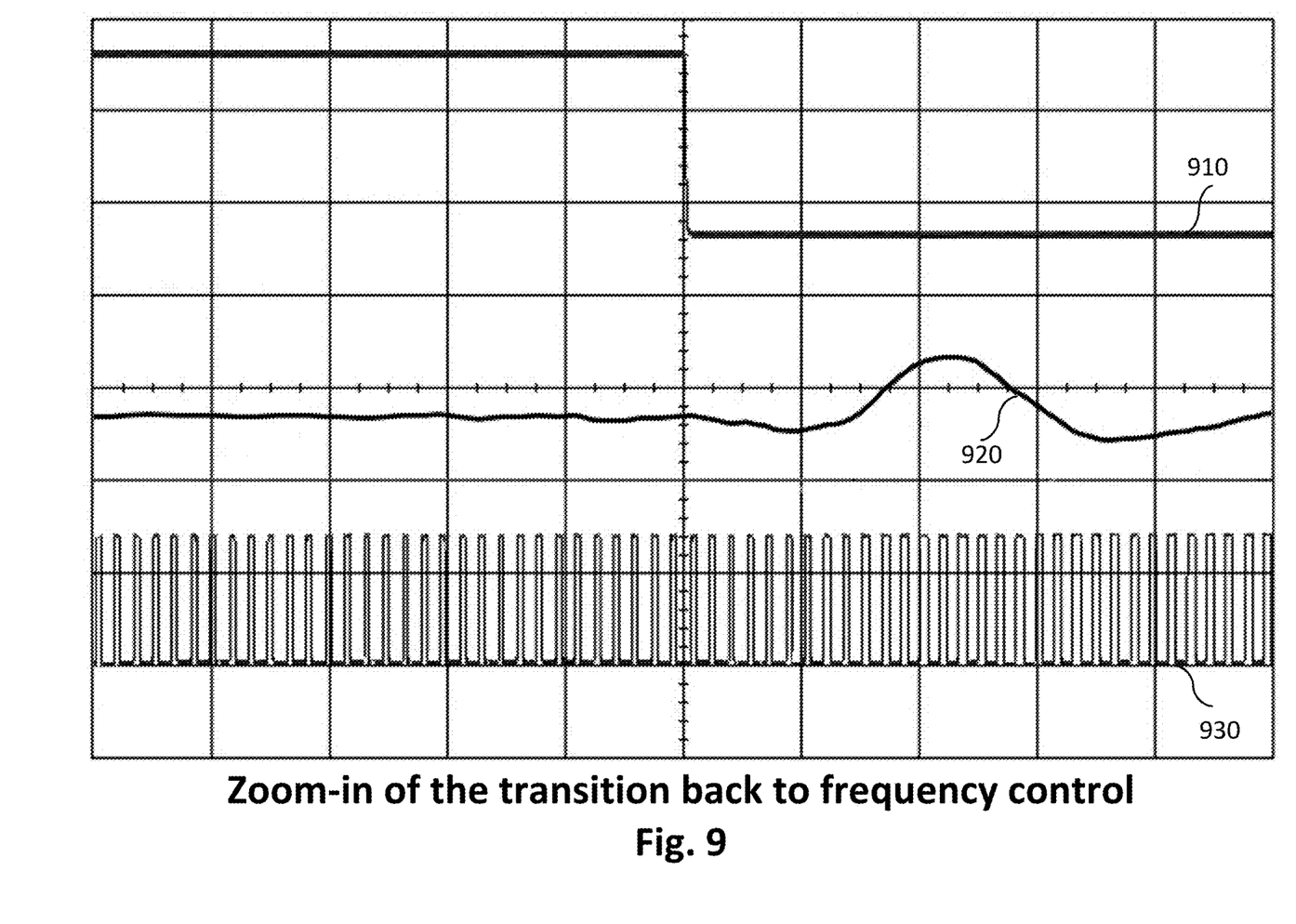

FIGS. 7-9 show an example of a transition from 82% load to 8% load with an output-voltage overshoot and the application of the SR-control mode to mitigate the output-voltage overshoot. The top waveforms 710, 810, 910 show the transition from steady-state mode to the SR-control mode and the transition from the SR-control mode to the steady-state mode.

The top waveform 710 in FIG. 7 shows the transition from frequency control mode to the SR-control mode and the transition from the SR-control mode to the frequency control mode. The middle waveform 720 is the output voltage Vout. The bottom waveform 730 is the SR gate pulse. The output voltage of waveform 720 is reduced to the nominal value within 150 is of the output-voltage overshoot. The controller remains in the SR-control mode for about 40 ms for the given load transient conditions, i.e., until the PFC stage has discharged to a value where the output voltage Vout cannot be properly regulated in the SR-control mode, which leads to controller saturation. Controller saturation re-initializes the control loop and causes the controller to switch back to steady-state mode.

FIG. 8 is a close-up view of the transition from frequency control mode to the SR-control mode in waveform 810, the output voltage Vout in waveform 820, and the SR gate pulse in waveform 830. FIG. 9 is a close-up view of the transition from the SR-control mode to the frequency control mode in waveform 910, the output voltage Vout in waveform 920, and the SR gate pulse in waveform 930.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
   a switching stage including first and second primary transistors;
   a resonant stage connected to the switching stage;
   a transformer including a primary winding connected to the resonant stage and a secondary winding;
   a rectifying stage connected to the secondary winding of the transformer and including first and second synchronous rectifiers; and
   a controller configured and/or programmed to operate in:
      a steady-state mode in which an output voltage of the converter is regulated by varying a switching frequency of the first and second primary transistors and of the first and second synchronous rectifiers; and
      a synchronous-rectification control mode in which the output voltage of the converter is regulated when an output-voltage overshoot is detected by switching the first and second primary transistors and the first and second synchronous rectifiers at a fixed switching frequency and by varying a duty cycle of the first and second synchronous rectifiers.

2. The converter of claim 1, wherein the fixed switching frequency is a maximum switching frequency of the converter that ensures zero voltage switching operation of the first and second primary transistors.

3. The converter of claim 1, wherein the controller switches from the synchronous-rectification control mode to the steady-state mode if either:
   the duty cycle of the first and second synchronous rectifiers is at a maximum duty cycle; or
   the output voltage drops below a nominal output voltage of the converter.

4. The converter of claim 1, wherein the switching stage includes third and fourth primary transistors.

5. The converter of claim 4, wherein the first, second, third, and fourth primary transistors of the switching stage are arranged in a full-bridge.

6. The converter of claim 1, wherein the first and second primary transistors of the switching stage are arranged in a half-bridge.

7. The converter of claim 1, wherein the resonant stage includes a resonant capacitor and a resonant inductor connected in series.

8. The converter of claim 1, wherein the resonant stage includes a magnetizing inductor connected in parallel with the primary winding.

9. The converter of claim 1, wherein:
   the secondary winding includes first and second secondary windings;
   the first synchronous rectifier is connected to the first secondary winding; and
   the second synchronous rectifier is connected to the second secondary winding.

10. The converter of claim 1, wherein each of the first and second primary transistors and the first and second synchronous rectifiers is a metal-oxide-semiconductor field-effect transistor.

11. The converter of claim 1, wherein each of the first and second synchronous rectifiers includes a transistor and a body diode connected in parallel with a channel of the transistor.

* * * * *